US010766358B2

(12) United States Patent
Kim et al.

(10) Patent No.: US 10,766,358 B2
(45) Date of Patent: Sep. 8, 2020

(54) TANK REINFORCEMENT WITH INTEGRATED BAFFLE

(71) Applicant: Plastic Omnium Advanced Innovation and Research, Brussels (BE)

(72) Inventors: Hyeon-Gyun Kim, Pohang-si (KR); Se-Hyung Park, Yongin-si (KR); Young-Man Kim, YongIn (KR); Laurent Duez, Uccle (BE)

(73) Assignee: Plastic Omnium Advanced Innovation and Research, Brussels (BE)

( * ) Notice: Subject to any disclaimer, the term of this patent is extended or adjusted under 35 U.S.C. 154(b) by 0 days.

(21) Appl. No.: 16/097,069

(22) PCT Filed: Apr. 20, 2017

(86) PCT No.: PCT/EP2017/059365
§ 371 (c)(1),
(2) Date: Oct. 26, 2018

(87) PCT Pub. No.: WO2017/186559
PCT Pub. Date: Nov. 2, 2017

(65) Prior Publication Data
US 2019/0105983 A1   Apr. 11, 2019

(30) Foreign Application Priority Data
Apr. 28, 2016   (EP) ..................... 16305492

(51) Int. Cl.
*B60K 15/03*   (2006.01)
*F01N 3/20*   (2006.01)

(52) U.S. Cl.
CPC .............. *B60K 15/03177* (2013.01); *B60K 2015/0344* (2013.01); *B60K 2015/0346* (2013.01);
(Continued)

(58) Field of Classification Search
CPC ............. B60K 15/03177; B60K 15/03; B60K 15/03006; B65D 25/04; B65D 11/22; B65D 11/20; F01N 3/2066
(Continued)

(56) References Cited

U.S. PATENT DOCUMENTS 2,860,809 A * 11/1958 Perry .................... B65D 90/52
                                                  220/563
3,610,457 A * 10/1971 Opalewski ............. B29C 33/14
                                                  220/563
(Continued)

FOREIGN PATENT DOCUMENTS

EP   2 511 068 A1   10/2012
EP   2 527 180 A1   11/2012
(Continued)

OTHER PUBLICATIONS

International Search Report dated Jun. 29, 2017 in PCT/EP2017/059365 filed Apr. 20, 2017.

Primary Examiner — Robert J Hicks
(74) Attorney, Agent, or Firm — Oblon, McClelland, Maier & Neustadt, L.L.P.

(57) ABSTRACT

A reinforcement structure made of plastic material for plastic vehicle tank. The reinforcement structure has a first portion comprising at least one weak section and at least one strong section, which are designed so that the weak section breaks before the strong section, when the first portion is under mechanical stress, the reinforcement structure also has at least one second portion designed to reduce the slosh noise, the second portion extends from the strong section.

15 Claims, 2 Drawing Sheets

(52) U.S. Cl.
CPC .. *B60K 2015/03493* (2013.01); *F01N 3/2066* (2013.01); *F01N 2610/1406* (2013.01)

(58) Field of Classification Search
USPC ..... 220/564, 563, 562, 555, 553, 4.14, 4.13, 220/4.12, 653, 652, 651, 645; 137/574, 137/571
See application file for complete search history.

(56) References Cited

U.S. PATENT DOCUMENTS

| | | | | |
|---|---|---|---|---|
| 4,143,193 | A | * 3/1979 | Rees | B29C 33/14 220/555 |
| 4,877,261 | A | * 10/1989 | Heisson | B62B 1/18 280/47.26 |
| 6,138,859 | A | 10/2000 | Aulph et al. | |
| 2006/0102634 | A1 | 5/2006 | Potter et al. | |
| 2011/0139793 | A1 | 6/2011 | Park | |
| 2012/0037638 | A1 | 2/2012 | Criel et al. | |
| 2013/0008908 | A1 | 1/2013 | Hill et al. | |
| 2014/0110038 | A1 | 4/2014 | Criel et al. | |
| 2015/0344183 | A1 | 12/2015 | Quant et al. | |
| 2016/0067905 | A1 | 3/2016 | Criel et al. | |
| 2016/0101683 | A1 | 4/2016 | Hill et al. | |

FOREIGN PATENT DOCUMENTS

| | | |
|---|---|---|
| EP | 2 756 977 A1 | 7/2014 |
| FR | 2 996 175 A1 | 4/2014 |
| WO | WO 2012/139962 A1 | 10/2012 |
| WO | WO 2014/131685 A2 | 9/2014 |
| WO | WO 2014/131686 A2 | 9/2014 |
| WO | WO 2015/059249 A1 | 4/2015 |

* cited by examiner

TANK REINFORCEMENT WITH INTEGRATED BAFFLE

The present invention is in the field of plastic vehicle tanks. More precisely, the present invention is related to a reinforcement structure for such plastic vehicle tanks. The invention also relates to a plastic vehicle tank which integrates such a reinforcement structure.

Reinforcement structures for plastic vehicle tank are known and may be located inside the tank during its manufacturing, at specific locations. Such reinforcement structures are provided in order to limit critical deformation of the tank with features able to deform or to break during a car crash in order to avoid, in an example of a fuel tank, a failure of the tank leading to a fuel leak which needs to be avoided for obvious reasons.

Various shapes of reinforcement structures exist in order to compensate forces that the tank endures during an impact. One example of reinforcement structure is described in patent application WO2012139962, in the name of the applicant, where reinforcement element is a hollow pillar with specific ratio between diameters of its cross section at its ends and its cross section at one intermediate portion in order to ensure a convenient breaking. Complex reinforcement structure is also described in patent application WO2015059249, in the name of the applicant and which is also incorporated by reference, where a central portion of the structure takes the form of a wall part with a central recess, which improves the inertia but also increases the space occupied inside the tank.

At the same time, specifically with the advent of hybrid cars, vehicle tanks also require to be provided with baffles to reduce the noise of liquid sloshes, also called "anti-slosh baffles". Indeed, such liquid sloshes are perceptible when the car is on electrical mode, using only the electrical engine, which makes audible unpleasant noise pollutions for passengers.

Such a slosh noise reduction baffle, as described in the patent application FR2996175, in the name of the applicant and incorporated by reference, can be a voluminous element which also requires to be located at specific locations, inside the tank.

Depending on the geometry of the tank, it is frequently the case that said specific locations, needed for a reinforcement element and baffles, are the same or are very close to each other. In such cases, manufacturers are forced to make a choice between tank deformation limitations and slosh reduction performance.

In order to overcome such a problem, it has already been proposed, in patent application WO2014131686, to clamp one baffle between two segments one locked to another, said segments forming a segmented reinforcement structure. However, in such proposed system, said baffle, which needs to be secured between two segments, extends almost all along the height of the structure, which increases the rigidity of the entire structure. Such a baffle extension could have prejudicial effects on mechanical properties of said entire structure, which can compromise the proper breaking of the structure during the impact. Furthermore, such a proposal has the drawback to increase the complexity of said structure because of the requirement of a plurality of segments and locking means.

It is therefore an object of the invention to provide a reinforcement structure which is able to reduce the slosh noise without impacting the mechanical properties of the structure, allowing to limit tank deformation, and which is also easy to manufacture and positioning inside the tank.

The invention relates to a reinforcement structure made of plastic material for plastic vehicle tank, said reinforcement structure comprises a first portion comprising at least one weak section and at least one strong section, which are designed so that said weak section breaks before said strong section, when said first portion is under mechanical stress, said reinforcement structure also comprises at least one second portion designed to reduce the slosh noise, said second portion extends from the strong section.

In other words, the first portion of a reinforcement structure of the invention can be divided in two differential sections, a weak section and a strong section, where the strong section is planned to be in contact with the second portion and where the weak section is designed to break, when an impact suffered by the tank causes very significant mechanical stress to the reinforcement structure, in order to limit tank deformations and avoid tank tearings. The weak section can comprise at least one breaking point which corresponds to an exact location where the breaking should take place in the weak section, in case of too high mechanical stress suffered by the structure. Said weak section and, more particular, said breaking point need to be separated from the location of the strong section, from which the second portion is extended, by a minimal distance, in order to preserve the appropriate mechanical properties of the weak section for a proper breaking. Inventors have found that, depending on the geometry of the first portion, a minimal distance of 10 mm between the breaking point and the closest point of the strong section from which the second portion extends, allows to preserve mechanical properties of the weak section for said proper breaking.

A weak section according to the invention has to be understood as a section of the first portion of the structure of the invention, which has specific mechanical properties for breaking before the strong section of said first portion when an event of mechanical stress is occurring on the reinforcement structure. For example, it can be an impact suffered by the tank inside which the reinforcement structure has been placed. By doing so, it is possible to compensate for the stress suffered by the tank and avoid that the wall of the tank tears. Such specific mechanical properties are the result of the fact that the weak section is designed to have a lower mechanical strength than said strong section. The weak section can, for example, be manufactured thinner than the strong section, during the manufacturing of the first portion, to reduce its mechanical strength and guarantee the breaking of the weak section at first place.

By "under mechanical stress", it has to be understood all kinds of stress which can undergo the structure of the invention, such as, but not limited to, tensile stress, flexural stress or shear stress.

In a particular embodiment of the invention, a reinforcement structure according to the invention can comprise at least two portions: a first portion and a second portion which are made in one piece. According to the invention, parts "made in one piece" shall be construed as parts providing, together, one single component which is made in one piece.

The reinforcement structure can be obtained by all known processes where a plastic material is moulded. Examples of such processes are, but not limited to, blow-moulding process, injection-moulding process or thermoforming process. Particularly good results are obtained with the injection-moulding of thermoplastic material.

The term "thermoplastic" denotes any thermoplastic polymer including thermoplastic elastomers, as well as blends thereof. The term "polymer" denotes both homopolymers and copolymers (especially binary or ternary copolymers).

Examples of such copolymers are, but not limited to, random copolymers, linear block copolymers, other block copolymers and graft copolymers. One polymer which is often used is polyethylene. Excellent results have been obtained with high density polyethylene (HDPE) and fiber reinforced polymer.

In another particular embodiment of the invention, the first portion which assures the limitation of tank deformation during an impact, can be a simple pillar with any geometrical shape that allows a proper breaking. Advantageously, said first portion is a hollow pillar which can have specific ratio between diameters of its cross section at the strong section and its cross section at the weak section.

According to an advantageous aspect of this embodiment, the first portion comprises a weak section and two strong sections which are each arranged at one end of said weak section. Such a disposal allows to control more precisely the breaking behavior of the structure of the invention, by positioning the at least one breaking point at an intermediate emplacement of the first portion.

In another particular embodiment of the invention, the first portion is a complex element which can comprise more than one simple pillar. For example, first portion can be a hollow circular structure with four simple pillars linking two ends of the first portion. Each of the four pillars can comprise at least one strong section, from which at least one second portion extends, and at least one weak section with one or more breaking points separated from the closest point of a strong section from which one second portion extends by a minimal distance. Such a designed first portion forming a hollow circular body can be used as a support for at least one active component of the tank. The expression "active component" denotes a component having an interaction with a fluid present in a fuel or SCR system. An active component according to the invention can be selected from the group consisting of: a pump; a filter; a level gauge; a heater; a general sensor (such as a temperature sensor, a quality sensor, a pressure sensor, etc.); a pressure regulator; a venturi tube or a venting valve. Reinforcement structure according to this embodiment, and especially first portion, can integrate supporting means in order to ensure support of one or more active components, which represents a significant space saving in the internal tank volume. All processes known by the man skilled in the art can be used to obtain fixation of active components on said support means. Alternatively, active components can be fixed directly on the reinforced structure, without using support means, for example, by direct welding of active component on the strong section of first portion.

In another particular embodiment of the invention, one of the two ends of the first portion can integrate a liquid trap. Advantageously, such a liquid trap can be moulded in one piece with said end of the first portion. Such a liquid trap is also suited for the supporting of hereby mentioned active components and has a perimeter that is closed up on itself, of any shape. Such a support by a liquid trap integrated inside the reinforcement structure of the invention further increases the saved space in the internal tank volume.

In another embodiment, said reinforcement structure has an axis of revolution and the second portion extends from the strong section in a radial direction. In other words, said reinforcement structure comprises a first portion with circular shape having an axis of revolution and the second portion forms a panel extending in a planar direction including the axis of revolution.

In another particular embodiment, said second portion has any suitable form that allows to reduce the slosh noise. Advantageously, said second portion offers a bearing surface of at least 2500 mm$^2$. Indeed, such a minimal bearing surface allows particularly good results in reducing slosh noise.

In a particular embodiment of the invention, the first portion and the at least one second portion are two independent parts, which are not made in one piece and where a first portion and at least one second portion can be put together, by all known means, to form the reinforcement structure of the invention. Said first portion and at least one second portion can be coupled, the second portion comprising at least one coupling means, which can be coupled inside a recess comprised in the strong section of the first portion. Any coupling means known by the man skilled in the art, which can be fixed in complementary recesses, can be used to obtain a coupling between second portion and strong section, provided that said coupling does not impact the mechanical properties of the weak section. Alternatively to the use of coupling means, the second portion can also be welded to the strong section. Such an alternative requires that the first portion and the second portion are both made with compatible welding material. It is perfectly conceivable that one reinforcement structure according to the invention comprises several second portions, where some of them are coupled with coupling means fixed inside complementary recesses of the strong section while the rest of them are welded to the strong section. It should be noticed that in all possible combinations of coupling or welding of the second portion, the hereby mentioned minimum distance requirement is respected.

The present invention also relates to an assembly composed of a plastic vehicle tank and a reinforcement structure according to the invention, which is in contact with at least one of an upper base and a lower base of the plastic vehicle tank. In a preferred embodiment of the invention, the reinforcement structure is welded to at least one of the upper and lower base of the plastic vehicle tank, preferably the reinforcement structure is welded to both bases. To do so, at least one of the ends of the first portion comprises a welding area made of a material weldable compatible with the material of the inner wall of the tank. Alternatively, one of the ends of said first portion is overmoulded with a material which is a compatible welding material with the material of the inner wall of the tank, in order to ensure a proper welding between the structure and the tank, which do not impact the mechanical properties of the weak section of the first portion. In another alternative, inner wall of the tank can be provided with means that allows coupling between at least one end of the first portion and the tank.

In a particular embodiment of the invention, the plastic vehicle tank is a liquid tank for vehicle, more preferably a fuel tank or an additive tank for selective catalytic reduction of NOx.

The invention will be better understood through the following figures which illustrate certain practical aspects of the invention. The figures are only shown as examples and do not limit the scope of the present invention.

Figure 1:
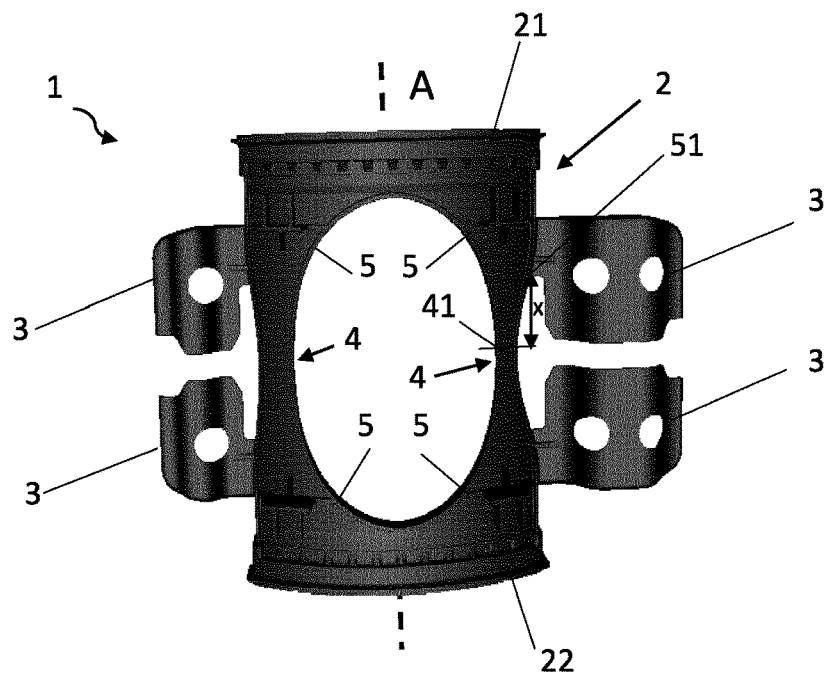
FIG. 1 is a reinforcement structure according to a first embodiment of the invention.

FIG. 1 shows a reinforcement structure 1 according to a first embodiment of the invention. Such a reinforcement structure 1 comprises a first portion 2 and four second portions 3. First portion 2 is designed to compensate for the forces that the tank (not shown on this figure) endures during an impact. To do so, first portion 2 comprises for weak sections 4 (only two are visible on FIG. 1) which are designed to break before the strong sections 5 when the first portion 2 is under mechanical stress. In this first embodiment, weak sections 4 are arranged between strong sections 5 and weak sections 4 are thinner than strong sections 5, which are arranged around them, in order to ensure a proper breaking of the reinforcement structure 1 in said weak sections 4, when said reinforcement structure is under mechanical stress. An example of mechanical stress is a compression in the axis of revolution A. Four second portions 3, which are designed to reduce the slosh noise, extend roughly in radial direction, perpendicular to the axis of revolution A of the reinforcement structure 1, and each second portion 3 extends from one strong section 5 with an adequate distance from the breaking point 41 of the nearest weak section 4, which corresponds to at least the minimal distance X. Said minimal distance X, at least equal to 10 mm, between the closest point 51 of strong section 5 from which second portion 3 extends, and the breaking point 41 of the nearest weak section 4, preserves the appropriated mechanical properties of said weak section 4 for a proper breaking of weak section 4 before a breaking of one strong section 5, when said reinforcement element 1 is under mechanical stress. The four second portions 3 have, in this example, two kinds of shape for reducing slosh noise, with one or two orifices, but all of them provide a bearing surface of at least 2500 mm$^2$. This difference of shape of the second portions 3 is the result of their locations in the tank and of the tank geometry.

In FIG. 1, said first portion 2 and second portion 3 are made in one piece by an injection moulding process of a plastic material, said plastic material being welding compatible with the material of the inner wall of the tank, which facilitates the manufacturing of such a structure 1 and also its integration in the tank. In an advantageous embodiment (not shown), the reinforcement structure 1, more particularly the first portion 2 and its strong sections 5, can be used as a support for active component of the tank, which allows to optimize the space occupied by the structure of the invention. In this embodiment, one of the two ends 21, 22 of the first portion 2 can integrate or form a liquid trap (not shown) that can trap a little amount of liquid in order to use it for other active components, supported or not by the structure, such as a pump.

Figure 2:
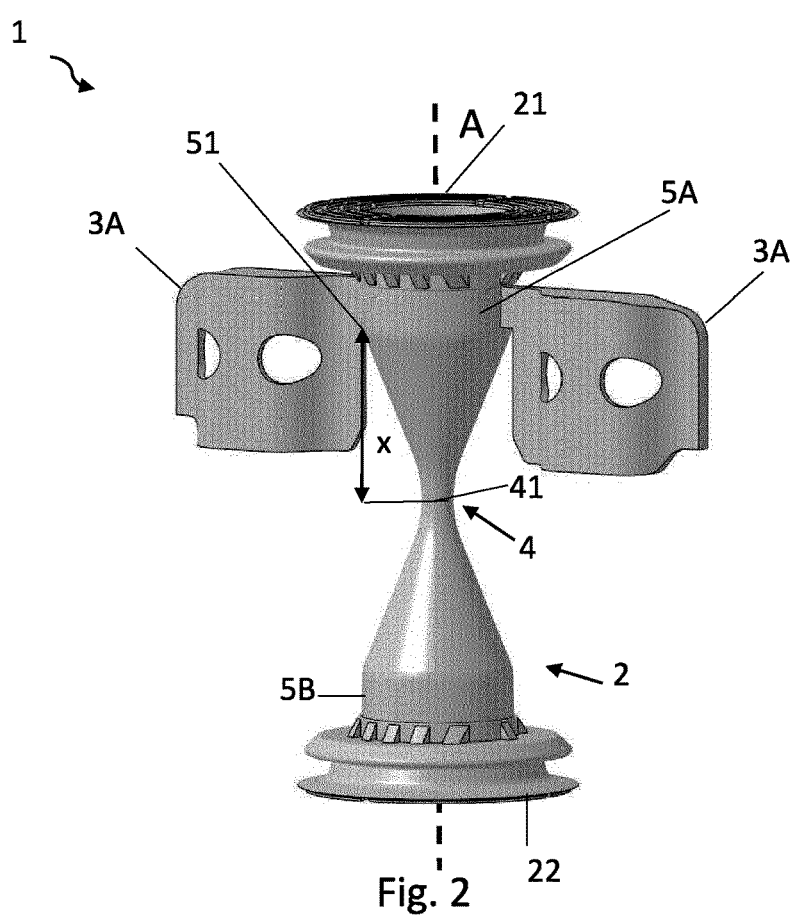
FIG. 2 is a reinforcement structure according to a second embodiment of the invention.

FIG. 2 is a reinforcement structure 1 according to a second embodiment of the invention. Such a reinforcement structure 1 comprises a first portion 2, which is a hollow pillar with a diabolo shape, and two second portions 3. In this embodiment the first portion 2 comprises one weak section 4 arranged between two strong sections 5A, 5B. The strong section 5A at the upper side of the end 21 of the first portion, is the strong section from which the two second portions 3 extend. Both of said two second portions 3 extend from the strong section 5A with a minimal distance X between the breaking point 41 of the weak section 4 and the closest point 51 of said breaking point 41 from which a second portion 3 extends, where X is at least equal to 10 mm$^2$.

Figure 3:
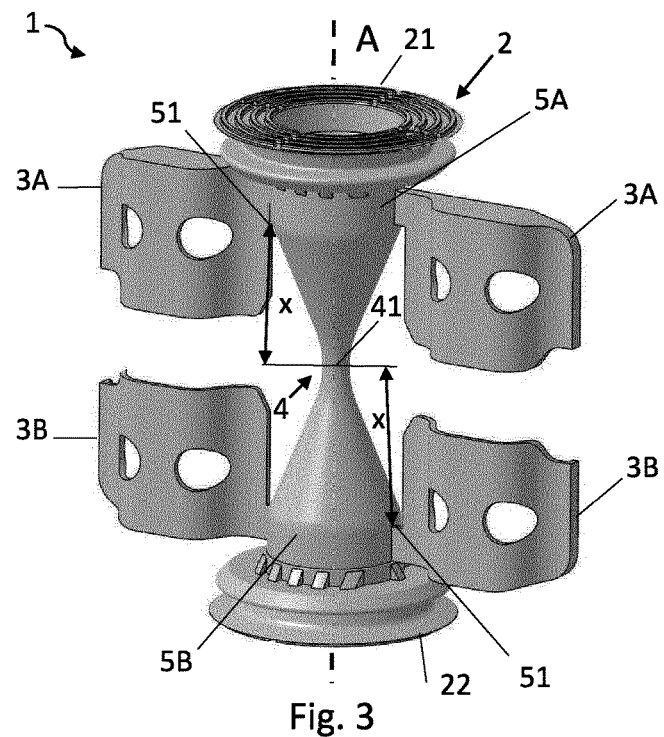
FIG. 3 is an alternative of the reinforcement structure of FIG. 2.

FIG. 3 is alternative of the reinforcement structure 1 of FIG. 2, where two additional second portions 3 extend from the strong section 5B with the same minimal distance requirement mentioned for extensions of second portions 3A of FIG. 2. In both FIG. 2 and FIG. 3, second portions 3A and 3B have the same shape, but it is also an embodiment of the invention, where said second portions 3A and 3B have different shapes depending of the geometry of the tank and the location of the reinforcement structure 1 inside the tank.

Figure 4:
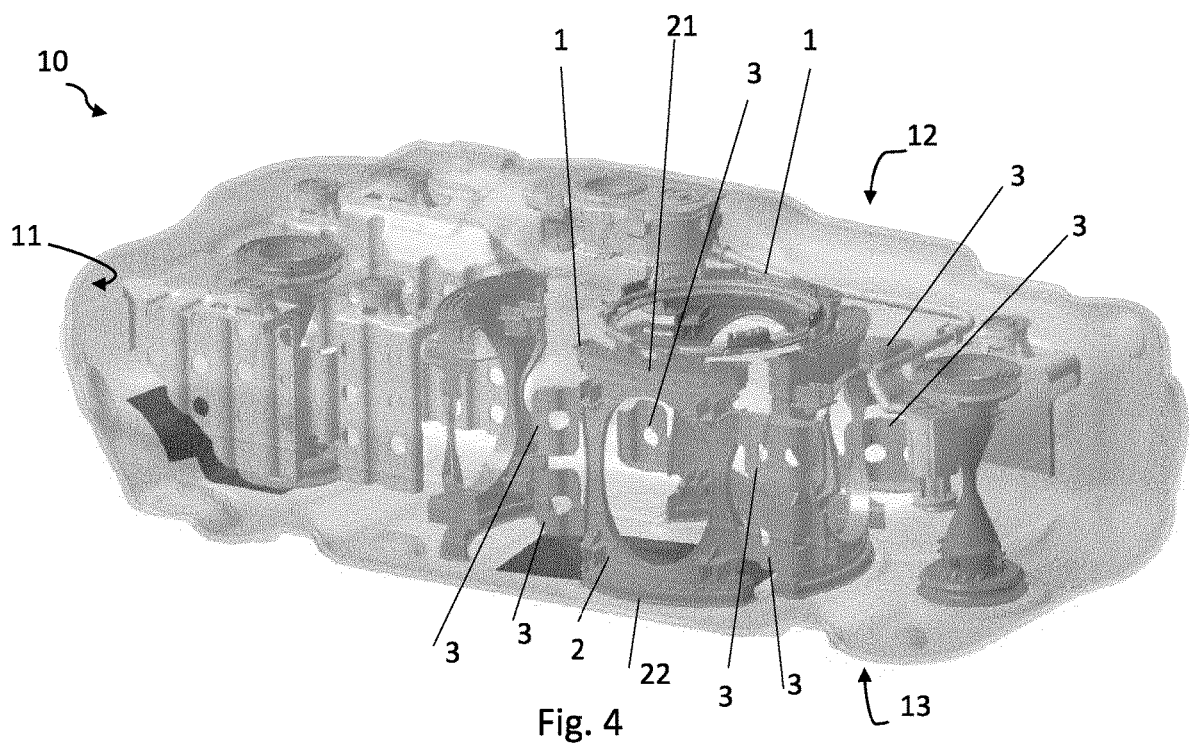
FIG. 4 is an assembly according to the invention.

FIG. 4 is an assembly composed, among other things, of a plastic vehicle tank 10 and two reinforcement structures 1 according to the invention. Said two reinforcement structures 1 comprise each one first portion 2 and four second portion 3, which are made in one piece from a plastic material. Such a plastic material is welding compatible with the material of the inner wall 11 of the tank 10. Said reinforcement structures are welded to upper part 12 and lower part 13 of the inner wall 11 of the tank 10 thanks to the ends 21, 22, of the first portions 2. The two reinforcement structures 1 are placed inside the tank 10 at specific locations where performances relating to both tank deformation limitations and slosh reduction are required. Consequently, such a reinforcement structure according to the invention allows, all at once, to compensate the stress suffered by the tank 10, avoid that the wall of the tank tears, reduce the slosh noise and saving space inside the tank 10.

Additionally, the two reinforcement structures 1 according to the invention and the two other reinforcement elements, devoid of second portion 3, can be positioned relative to one another to form a containment volume altogether. Such a containment volume can be used for operations relative to active components, such as a pump.

The invention is not limited to the above embodiments and other embodiments exist and will appear clearly to one skilled in the art.

The invention claimed is:

1. Reinforcement structure made of plastic material for a plastic vehicle tank, said reinforcement structure comprising: a first portion comprising at least one weak section and at least one strong section, which are designed so that said weak section breaks before said strong section when said first portion is under mechanical stress; and at least one second portion designed to reduce the slosh noise, said second portion extends from said strong section, wherein the first portion and the second portion are made in one piece, wherein the reinforcement structure is designed to be welded to an upper base and a lower base of the plastic vehicle tank.

2. The reinforcement structure according to claim 1, wherein said weak section is thinner than said strong section.

3. The reinforcement structure according to claim 1, wherein the weak section comprises at least one breaking point which is separated from the closest point of the strong section, from which the second portion extends, by a minimal distance.

4. The reinforcement structure according to claim 3, wherein said minimal distance is at least 10 mm.

5. The reinforcement structure according to claim 1, wherein said reinforcement structure has an axis of revolution and wherein the second portion extends from the strong section in a radial direction.

6. The reinforcement structure according to claim 1, wherein the second portion offers a bearing surface of at least 2500 mm$^2$.

7. The reinforcement structure according to claim 1, wherein the second portion comprises at least one coupling means which are coupled inside a recess comprised in the strong section.

8. The reinforcement structure according to claim 1, wherein all said reinforcement structure is made of a thermoplastic material.

9. The reinforcement structure according to claim 1, wherein said thermoplastic material is a thermoplastic polymer selected from the group consisting of polyethylene, high density polyethylene (HDPE), and fiber reinforced polymer.

10. The reinforcement structure according to claim 1, wherein the first portion comprises supporting means in order to ensure support of at least one active component.

11. The reinforcement structure according to claim 1, wherein at least one active component is welding on the strong section of first portion.

12. An assembly composed of a plastic vehicle tank and the reinforcement structure according to claim 1, wherein the reinforcement structure is welded to an upper base and a lower base of the plastic vehicle tank.

13. The assembly according to claim 12, wherein the plastic vehicle tank is a liquid tank for a vehicle.

14. The assembly according to claim 13, wherein the plastic vehicle tank is a fuel tank or an additive tank for selective catalytic reduction of NOx.

15. The reinforcement structure according to claim 1, wherein the first portion and the second portion are made in one piece by an injection-moulding process.

* * * * *